United States Patent
Ohki et al.

(10) Patent No.: US 8,756,508 B2
(45) Date of Patent: Jun. 17, 2014

(54) GESTURE RECOGNITION APPARATUS, GESTURE RECOGNITION METHOD AND PROGRAM

(75) Inventors: Yoshihito Ohki, Tokyo (JP); Osamu Shigeta, Tokyo (JP)

(73) Assignee: Sony Corporation, Tokyo (JP)

( * ) Notice: Subject to any disclaimer, the term of this patent is extended or adjusted under 35 U.S.C. 154(b) by 149 days.

(21) Appl. No.: 13/084,092

(22) Filed: Apr. 11, 2011

(65) Prior Publication Data
US 2011/0320949 A1    Dec. 29, 2011

(30) Foreign Application Priority Data
Jun. 24, 2010  (JP) ................................ P2010-143651

(51) Int. Cl.
G06F 3/16 (2006.01)
G06F 3/048 (2013.01)
G06F 17/24 (2006.01)

(52) U.S. Cl.
CPC .................................. *G06F 17/245* (2013.01)
USPC .......................................... 715/727; 715/783

(58) Field of Classification Search
USPC ................................................. 715/727, 863
See application file for complete search history.

(56) References Cited

U.S. PATENT DOCUMENTS

| 7,971,156 B2* | 6/2011 | Albertson et al. ............. 715/863 |
| 2008/0219502 A1* | 9/2008 | Shamaie ........................ 382/103 |
| 2009/0100383 A1* | 4/2009 | Sunday et al. ................. 715/863 |

FOREIGN PATENT DOCUMENTS

| JP | 6-266494 | 9/1994 |
| JP | 2004-303207 | 10/2004 |
| JP | 2005-178473 | 7/2005 |
| JP | 2006-209563 | 8/2006 |

OTHER PUBLICATIONS

Feb. 25, 2014, Japanese Office Action in related JP application No. 2010-143651.
Mori, et al., Early Recognition and Prediction of Gestures for Embodied Proactive Human Interface, Journal of the Robotics Society of Japan, Nov. 15, 2006, p. 66-75, vol. 24, No. 8, Japan.
Amamoto, et al., Boosting-Like Training for Early Recognition and Its Application to Online Character Recognition, The Institute of Electronics, Information and Communication Engineers Technical Report, Feb. 14, 2008, p. 81-86, vol. 107, No. 491, Japan.

* cited by examiner

*Primary Examiner* — David Phantana Angkool
(74) *Attorney, Agent, or Firm* — Sherr & Jiang, PLLC

(57) ABSTRACT

There is provided a gesture recognition apparatus including a recognition unit for recognizing a gesture based on a set of gesture information input in a given input period, a prediction unit for predicting the gesture from halfway input gesture information among the set of gesture information, and a notification unit for notifying a user of prediction information about the result of predicting the gesture. A user can confirm what kind of gesture is recognized by continuing to input gesture information through a notification of the prediction information.

17 Claims, 14 Drawing Sheets

GESTURE RECOGNITION APPARATUS, GESTURE RECOGNITION METHOD AND PROGRAM

BACKGROUND OF THE INVENTION

1. Field of the Invention

The present invention relates to a gesture recognition apparatus, a gesture recognition method, and a program.

2. Description of the Related Art

In recent years, recognition of a gesture input as an action or utterance of a user to control, for example, a system has been generally performed (Japanese Patent Laid-open Publication No. 2006-209563). In the gesture recognition, the gesture is recognized using a set of gesture information based on an action or utterance input to a video camera or a microphone. The set of gesture information is, for example, information based on a set of images obtained by capturing an action process of an object or a set of vocal sounds obtained capturing a speech process of, for example, a keyword.

In gesture recognition, feedback of an input of gesture information (hereinafter, referred to gesture feedback) is important in improving convenience of a system to which the gesture recognition is applied. Appropriate gesture feedback allows correction of an erroneous input of the gesture information to be requested to a user and a method of inputting a gesture to be taught to the user.

In a related art, display of an image indicating a user action process as gesture feedback, for example, on a display device is known. In this case, the user can intuitively understand an input state of gesture information by confirming the image. Further, display of information such as a locus indicating the user action process, instead of the image indicating the user action process, is also known.

SUMMARY OF THE INVENTION

However, in these methods, a gesture is not predicted from halfway input gesture information and a user is not notified of prediction information about the result of predicting the gesture. Here, the gesture prediction information may be the gesture prediction result itself or the reliability of the gesture prediction result. The gesture prediction information may be an indicator indicating what kind of gesture is recognized by continuing to input the gesture information or to what degree of reliability the gesture is recognized in some cases. Thereby, in a related art, correction of an erroneous input of gesture information is not requested to a user, nor is a method of inputting a gesture taught to the user, and thus appropriate gesture feedback is not sufficiently performed.

In light of the foregoing, it is desirable to provide a gesture recognition apparatus, a gesture recognition method, and a program capable of performing appropriate gesture feedback using gesture prediction information.

According to an embodiment of the present invention, there is provided a gesture recognition apparatus including a recognition unit for recognizing a gesture based on a set of gesture information input in a given input period, a prediction unit for predicting the gesture from halfway input gesture information among the set of gesture information, and a notification unit for notifying a user of prediction information about the result of predicting the gesture.

The prediction information for the gesture may include the reliability of the gesture prediction result.

The reliability of the prediction result may be represented as a ratio of the halfway input gesture information to the set of gesture information.

The reliability of the prediction result may sharply increase when the ratio increases.

The notification unit may initiate a notification of the prediction information when the reliability of the prediction result is equal to or more than a given threshold.

The notification unit may terminate the notification of the prediction information when the set of gesture information is not input in the input period.

The notification unit may notify of a list of recognizable gestures when a frequency at which the set of gesture information is not input in the input period is equal to or more than a given threshold.

The gesture recognition apparatus may further include a second notification unit for notifying a user of the gesture information.

The gesture recognition apparatus may further include an input unit for inputting image information as the gesture information.

The gesture recognition apparatus may further include an input unit for inputting voice information as the gesture information.

According to another embodiment of the present invention, there is provided a gesture recognition method including the step of recognizing a gesture based on a set of gesture information input in a given input period. The recognition step may include predicting the gesture from halfway input gesture information among the set of gesture information, and notifying a user of prediction information about the result of predicting the gesture.

According to another embodiment of the present invention, there is provided a program for causing a computer to execute the step of recognizing a gesture based on a set of gesture information input in a given input period. The recognition step may include predicting the gesture from halfway input gesture information among the set of gesture information, and notifying a user of prediction information about the result of predicting the gesture.

According to the embodiments of the present invention described above, it is possible to provide a gesture recognition apparatus, a gesture recognition method, and a program capable of performing appropriate gesture feedback using gesture prediction information.

DETAILED DESCRIPTION OF THE EMBODIMENT(S)

Figure 1:
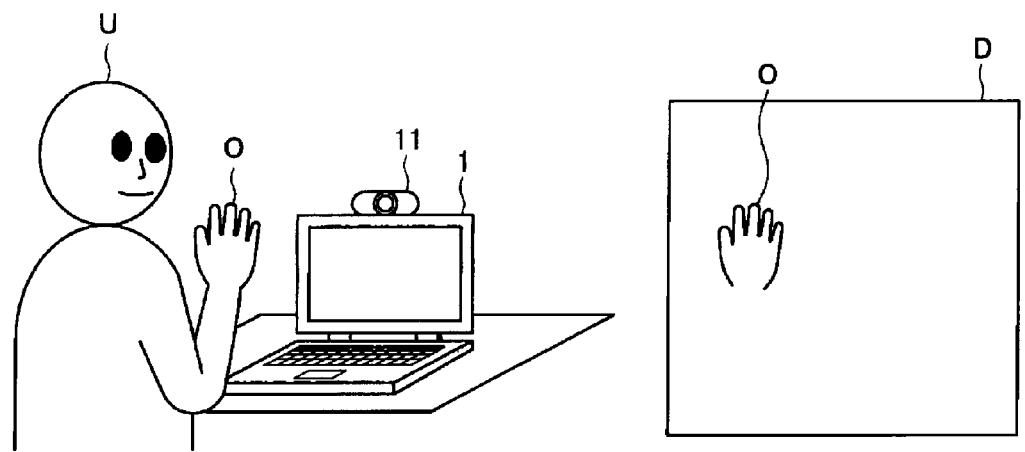
FIG. 1 is a diagram showing an overview of a gesture recognition apparatus according to an embodiment of the present invention.
Figure 1:
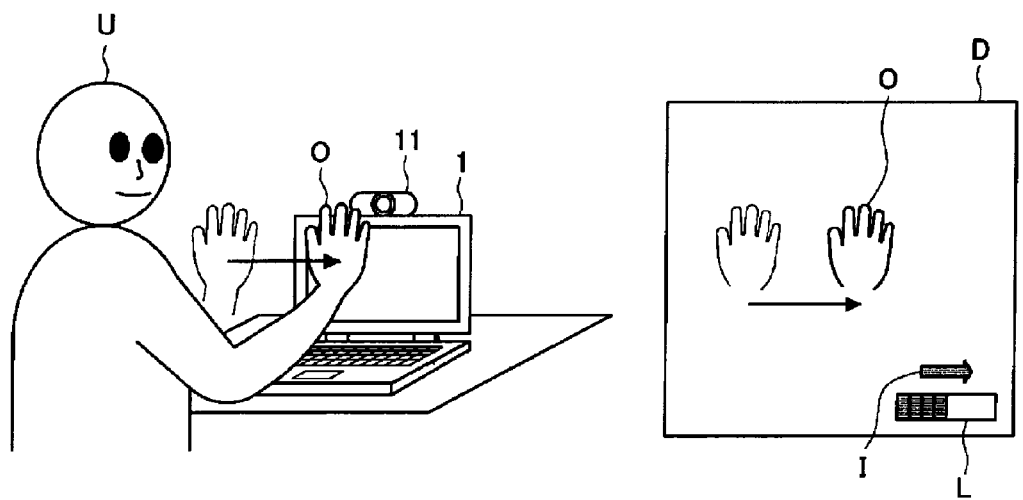

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted

[1. Overview of Gesture Recognition Apparatus]

First, an overview of a gesture recognition apparatus 1 according to an embodiment of the present invention will be described with reference to FIG. 1. As shown in FIG. 1, the gesture recognition apparatus 1 performs appropriate gesture feedback using prediction information about the result of predicting a gesture.

The gesture recognition apparatus 1 is an information processing apparatus such as a personal computer, a television receiver, a portable information terminal, or a portable telephone. A moving image signal from a moving image sensor 11 such as a video camera is input to the gesture recognition apparatus 1, and a voice signal from a voice sensor (not shown) such as a microphone is input to the gesture recognition apparatus 1. The gesture recognition apparatus 1 may be formed integrally with or separately from the moving image/voice sensor.

When a user U performs a given action in front of the moving image sensor 11, the gesture recognition apparatus 1 recognizes an action gesture based on the moving image signal. When the user U utters a given utterance around the voice sensor, the gesture recognition apparatus 1 recognizes a speech gesture based on the voice signal. Here, the action gesture is recognized based on gesture information including a set of images obtained by capturing an action process of an object O (e.g., a hand), and the speech gesture is recognized using gesture information based on a set of vocal sounds obtained by capturing a speech process of, for example, a keyword.

The action gesture may include, for example, a flick gesture of moving the object O to the right in front of the moving image sensor 11, and a shielding gesture of shielding the front of the moving image sensor 11 with the object O. The speech gesture may include, for example, a gesture of speaking a given word, phrase, clause, or sentence around the voice sensor.

Here, when an application to a music playback application is assumed, for example, left and right flick gestures correspond to forward and rewind, respectively, and the shielding gesture corresponds to stop. For example, an utterance "Saisei Teisi" may correspond to music stop, and utterances "Saisei Okuri" and "Saisei Modosi" may correspond to forward and rewind, respectively. Likewise, a combination of given action and speech gestures may correspond to various processes.

The gesture recognition apparatus 1 performs appropriate gesture feedback using prediction information about the result of predicting a gesture as follows. As described above, the gesture recognition apparatus 1 recognizes a gesture using a set of gesture information input in a given input period. When the gesture is recognized, a process corresponding to the recognized gesture is executed.

In a gesture recognition process, a gesture is predicted from halfway input gesture information among a set of gesture information, and gesture prediction information is notified of by the user U. Here, the gesture prediction information may be a gesture prediction result itself or the reliability of the prediction result.

In FIG. 1, an example of a notification of the prediction information is shown. In the gesture recognition apparatus 1, an image in front of the sensor is captured in real time and displayed on a display D. When the user U initiates an input of a gesture, the gesture prediction information is displayed on the display D.

In the example shown in FIG. 1, when the user U moves the hand O to the right, an input of a right flick gesture is predicted, and an icon I for specifying the right flick gesture and a level meter L indicating the reliability of the result of prediction are displayed. In this example, when the hand O is further moved to the right, the reliability of the prediction result increases and the display of the level meter L is updated. When the hand O is moved to the right a given distance, the right flick gesture is recognized and a process corresponding to the right flick gesture is executed.

Thus, the user U can confirm what kind of gesture is recognized by continuing to input the gesture information through the notification of the prediction information. Accordingly, when expected prediction information is not obtained, the user U can notice an erroneous input of the gesture information and correct the input. Further, the user U can intuitively understand a how to input the gesture by inputting the gesture information in trial and error and confirming the prediction information.

[2. Configuration of Gesture Recognition Apparatus]

Next, a primary functional configuration of the gesture recognition apparatus 1 will be described with reference to FIG. 2. Hereinafter, a case in which a gesture of an action of the hand O of the user U is recognized will be described.

Figure 2:
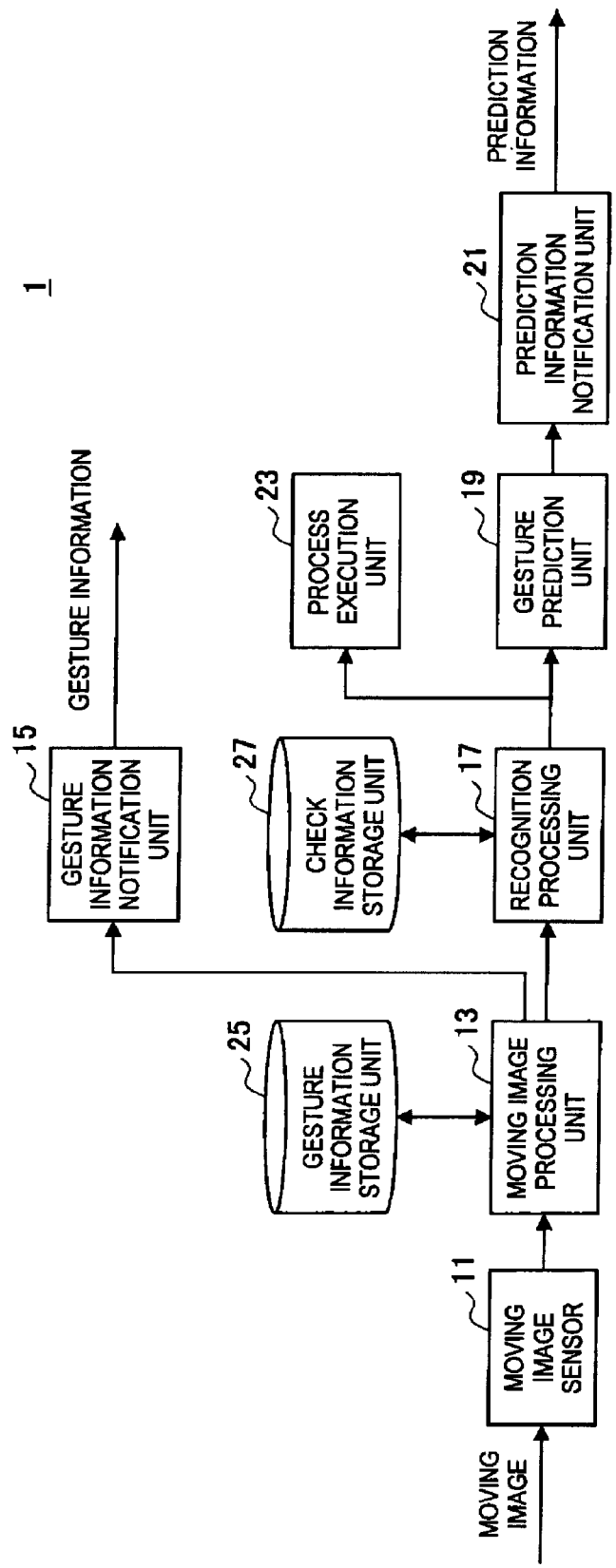
FIG. 2 is a block diagram showing a primary functional configuration of the gesture recognition apparatus.

As shown in FIG. 2, the gesture recognition apparatus 1 includes a moving image sensor 11, a moving image processing unit 13, a gesture information notification unit (second notification unit) 15, a recognition processing unit (recognition unit) 17, a gesture prediction unit (prediction unit) 19, a prediction information notification unit (notification unit) 21, a process execution unit 23, a gesture information storage unit 25, and a check information storage unit 27.

The moving image sensor 11 images a scene in front of the sensor and generates a moving image signal indicating the result of imaging. The scene in front of the sensor includes an image of an object O, which is a recognition object, or an image of a background.

The moving image processing unit 13 processes the moving image signal supplied from the moving image sensor 11 and generates gesture information. The gesture information is information indicating the action of the object O. The gesture information is temporarily stored in the gesture information storage unit 25.

The gesture information notification unit 15 notifies the user U of the gesture information supplied from the moving image processing unit 13. The gesture information may be notified as image information indicating an action process of the hand O or as voice information indicating the action process of the hand O. The gesture information notification unit 15 notifies the user U of the gesture information through a display D or a speaker, which is not shown.

The recognition processing unit 17 reads the gesture information from the gesture information storage unit 25 and check information from the check information storage unit 27, and processes the gesture information based on the check information. The recognition processing unit 17 checks a set of gesture information and the check information for each gesture, which is a recognition object, and generates the result of the check. The check information is information to be checked with a set of gesture information to recognize the gesture, and is set for each gesture, which is a recognition object, in advance. For example, the check information for the action gesture is set as a movement pattern (e.g., moving direction, distance and speed) of the object O moving in a given direction. The check result corresponds to a similarity between a movement pattern indicated by the set of gesture information and a movement pattern indicated by the check information for each gesture.

The gesture prediction unit 19 predicts a gesture about to be input based on the check result supplied from the recognition processing unit 17. The gesture prediction unit 19 specifies a gesture having the highest similarity as the gesture prediction result. Further, the similarity of the predicted gesture is specified as the reliability of the prediction result. The gesture prediction information is information on the gesture prediction result, and includes the gesture prediction result itself and/or the reliability of the prediction result. Here, the gesture prediction result is an indicator indicating what kind of gesture is recognized by continuing to input the gesture information, and the reliability of the prediction result is an indicator indicating to what level of reliability the gesture is recognized.

The prediction information notification unit 21 notifies the user U of the gesture prediction information supplied from the gesture prediction unit 19. The prediction information may be notified of as image information or as voice information. The prediction information notification unit 21 notifies the user U of the prediction information through a display D or a speaker, which is not shown.

The process execution unit 23 executes a process corresponding to the recognized gesture based on the gesture recognition result. In the process execution unit 23, for example, when the left and right flick gestures are recognized, forward and rewind processes are executed and when the shielding gesture is recognized, a stop process is executed.

The moving image sensor 11 is formed as an image input device such as a video camera. The moving image processing unit 13, the gesture information notification unit 15, the recognition processing unit 17, the gesture prediction unit 19, the prediction information notification unit 21, and the process execution unit 23 are formed as an information processing apparatus with a processor such as a CPU or a DSP. The gesture information notification unit 15 and the prediction information notification unit 21 are connected to the display D or the speaker, which is not shown. The gesture information storage unit 25 and the check information storage unit 27 are formed as internal storage devices such as memories, or external storage devices.

At least some functions of the components may be realized as hardware such as a circuit or as software such as a program. Further, when each component is realized as software, the function of the component is realized through a program executed on a processor.

[3. Operation of Gesture Recognition Apparatus]

Figure 3:
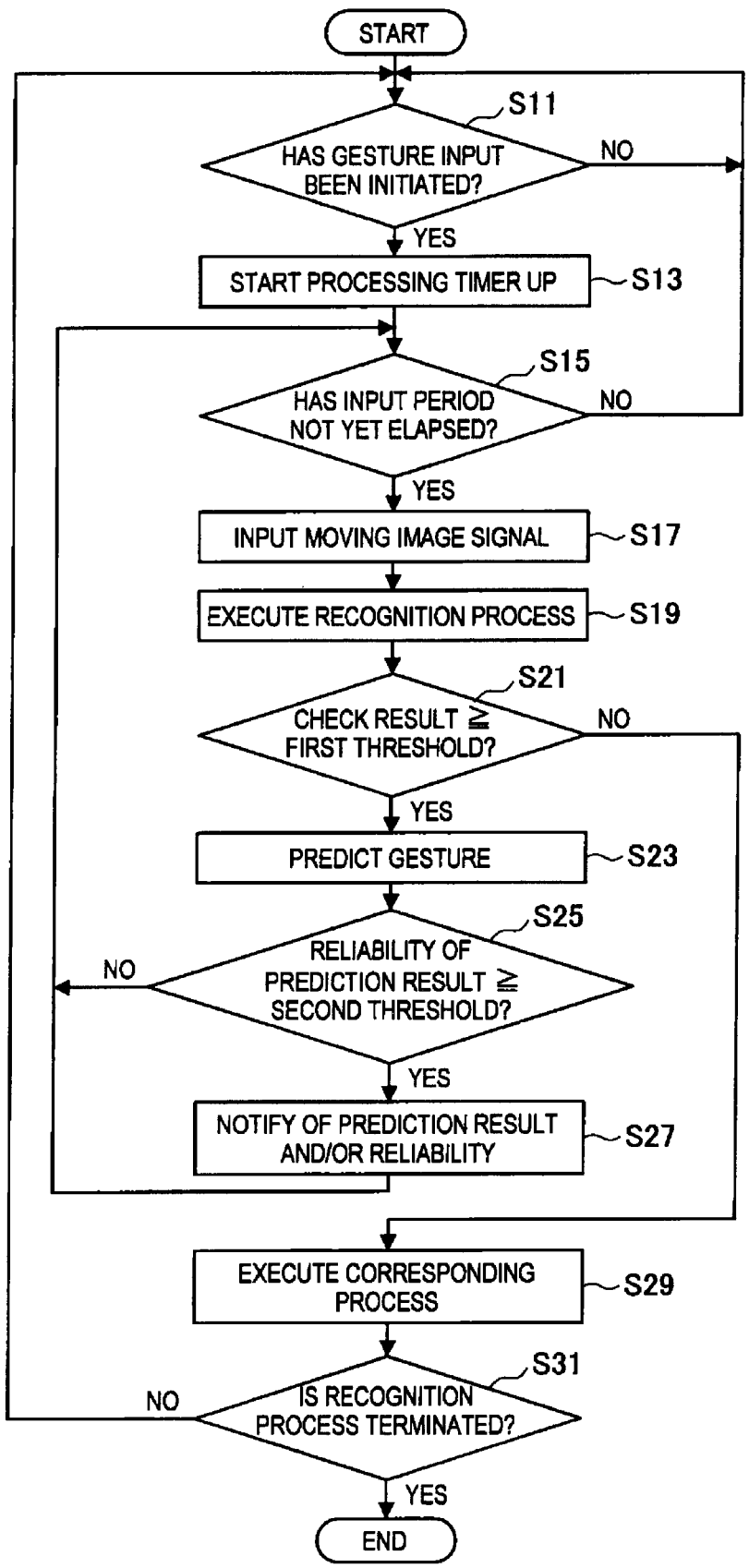
FIG. 3 is a flow diagram showing operation of the gesture recognition apparatus.

Next, operation of the gesture recognition apparatus 1 will be described with reference to FIGS. 3 to 7. As shown in FIG. 3, the gesture recognition apparatus 1 judges whether a gesture input has been initiated (step S11). In the moving image sensor 11, a scene in front of the sensor is imaged and a moving image signal indicating the result of imaging is generated. In the moving image processing unit 13, a frame image is generated from the moving image signal.

Here, the gesture input initiation may be judged based on presence of a recognition object in front of the sensor. In this case, in the recognition processing unit 17, it is judged whether an object O being recognized is included in a frame image using a technique such as pattern recognition. When the result of the judgment is positive, it is judged that the input has been initiated. In the recognition processing unit 17, it may be judged whether the object O recognized is included in a gray scale image generated with a coarse resolution compared to the frame image.

Alternatively, the gesture input initiation may be judged based on a movement state of the recognition object in front of the sensor. In this case, in the moving image processing unit 13, a gray scale image with a coarse resolution compared to the frame image is generated. A motion region is detected based on a frame difference between the gray scale images, i.e., a change region, and a center position of a motion region is generated as gesture information. The gesture information is temporarily stored in the gesture information storage unit 25. It is judged whether the object O being recognized has initiated a movement in a given movement pattern based on the gesture information in a given period. When the result of the judgment is positive, it is determined that the input has been initiated.

Here, when it is judged that the input has been initiated, a processing timer (not shown) starts up (step S13), and a process in step S15 and subsequent steps is initiated. On the other hand, when it is not judged that the input has been initiated, the judgment process in step S11 is repeated.

When it is judged that the input has been initiated, it is judged whether the given input period has elapsed based on the processing timer (step S15). The input period is set as a period sufficient to recognize the gesture (e.g., fractions of a second to several seconds) based on a set of gesture information.

Next, a moving image signal indicating the scene in front of the sensor is input (step S17), as in the process of judging whether the input has been initiated. In the moving image sensor 11, the scene in front of the sensor is imaged and the moving image signal indicating the result of imaging is generated. In the moving image processing unit 13, for example, the following moving image processing is performed.

In the moving image processing unit 13, first, a frame image is created from the moving image signal and a gray scale image with a coarse resolution compared to the frame image is generated. A motion region is detected based on a frame difference between the gray scale images, i.e., a change region, and a center position of a motion region is generated as gesture information. The motion region can be efficiently detected by using the gray scale images.

In the gesture information notification unit 15, the user U is notified of gesture information as information indicating the recognition object itself and/or an action of the recognition object. The gesture information is temporarily stored in the gesture information storage unit 25 in association with an order of generating the gesture information. The gesture information is temporarily stored in the gesture information storage unit 25 at least over the input period.

Next, a recognition process is executed (step S19). In the recognition processing unit 17, a set of gesture information input from an initiation time of the input period is read from the gesture information storage unit 25. Further, when the input initiation is judged based on the movement state of the recognition object, the gesture information used in the judgment process may be included in the set of gesture information. Further, the check information for each gesture, which is a recognition object, is read from the check information storage unit 27. Next, the set of gesture information and the check information for each gesture, which is a recognition object, are checked and the result of the check is generated.

Next, it is judged whether the check result is equal to or more than a first given threshold (step S21). In the recognition processing unit 17, it is judged whether the check result of any gesture shows a similarity of the first threshold or more. The first threshold is such a similarity that a gesture being recognized can be appropriately recognized and is set according to accuracy necessary for the recognition process. Accordingly, it is judged which gesture is recognized as a recognition object.

For example, the similarity of the flick gesture is represented as a ratio of an actual movement distance to a distance to be moved until the gesture is recognized. The similarity may be represented as a function including the ratio of the actual movement distance to the distance to be moved, as a parameter. In this case, the similarity may slowly increase according to the distance ratio when the distance ratio is relatively small and rapidly increase according to the distance ratio when the distance ratio is relatively great.

Here, when any gesture has been recognized, a process corresponding to the recognized gesture is executed in the process execution unit 23 (step S29). It is judged whether the recognition process is to be terminated (step S31). When the result of the judgment is positive, the process is terminated, and when the judgment result is negative, the process returns to step S11. Alternatively, the termination of the recognition process may be judged at any timing between steps S11 and S29.

On the other hand, when no gesture has been recognized, a gesture being about to be input is predicted (step S23). In the gesture prediction unit 19, based on the check result supplied from the recognition processing unit 17, a gesture having the highest similarity is specified as the gesture prediction result, and the similarity of the predicted gesture is specified as the reliability of the prediction result.

Next, it is judged whether the reliability of the prediction result is equal to or more than a second given threshold (step S25). In the prediction information notification unit 21, it is judged whether the reliability of the prediction result supplied from the gesture prediction unit 19 is equal to or more than the second threshold. The second threshold is such a similarity that the initiation of any of the gestures as recognition objects is recognized and is set according to recognition accuracy necessary for the recognition process. Here, the second threshold is set as a smaller similarity than the first threshold used for recognition of the gesture. Accordingly, it is judged whether the initiation of any of the gestures as recognition objects is recognized.

Here, when the judgment result is positive, the prediction information notification unit 21 notifies the user U of the gesture prediction result itself and/or the reliability of the prediction result (step S27), and when the judgment result is negative, the prediction information notification unit 21 does not notify the user U. That is, the prediction information is notified of when the initiation of any of the gestures as recognition objects is recognized. The process returns to step S15, in which it is judged whether the input period has elapsed.

Figure 4A:
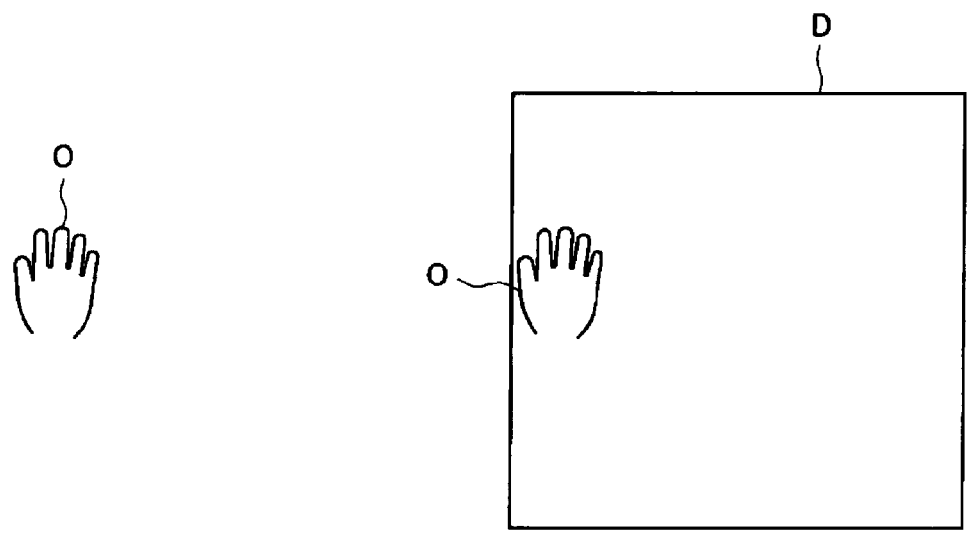
FIG. 4A is a diagram (1/5) showing an example of a notification of a prediction result and the reliability of the prediction result.

In FIGS. 4A to 4E, an example of a notification of a prediction result and the reliability of the prediction result are shown. As shown in FIG. 4A, when presence of an object O being recognized (a hand O of the user U) in front of the sensor is recognized, it is judged that a gesture input has been initiated. An image obtained by capturing the hand O is displayed on the display D. When it is judged that the input has been initiated, an input period is initiated due to start-up of a processing timer, and an input of the gesture information and an execution of a recognition process are initiated. Further, during execution of the recognition process, an image obtained by capturing a scene in front of the sensor is displayed on the display D in real time.

Figure 4B:
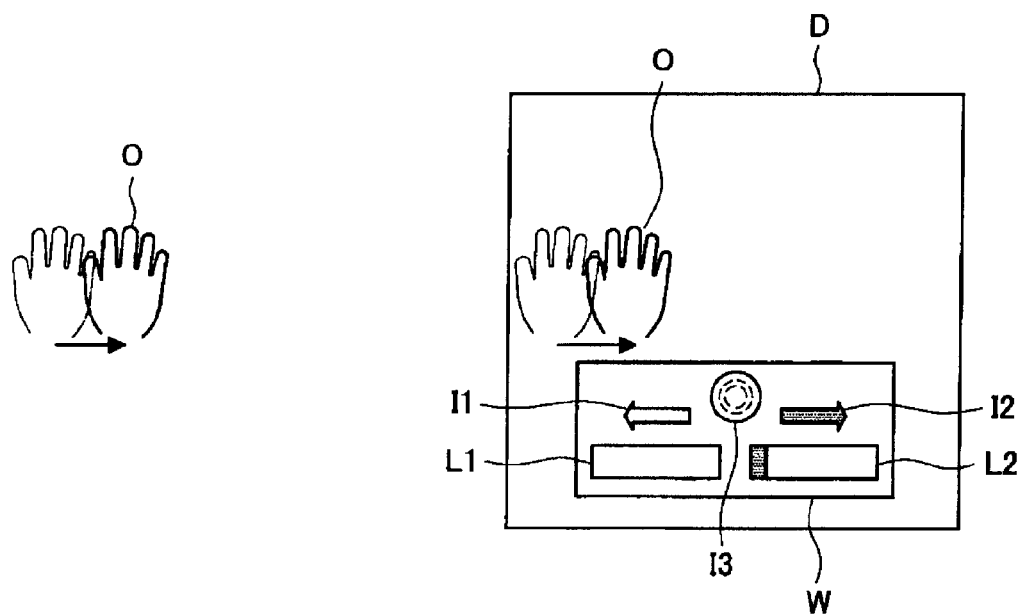
FIG. 4B is a diagram (2/5) showing an example of a notification of a prediction result and the reliability of the prediction result.

As shown in FIG. 4B, when it is judged that the reliability of the result of predicting any gesture is equal to or more than the second threshold, a notification of the gesture prediction information is initiated. An image obtained by capturing the hand O and a window W indicating the prediction information are displayed on the display D. Icons I1, I2 and I3 indicating gestures as recognition objects (e.g., left and right flick gestures and a shielding gesture) and level meters L1 and L2 indicating the reliability of prediction results are displayed in the window W.

In the example shown in FIG. 4B, when the user U moves the hand O from the state shown in FIG. 4A to the right a certain distance, a right flick gesture is specified as the prediction result and it is judged that the reliability of the prediction result is equal to or more than the second threshold. In the window W, the icon I2 indicating the right flick gesture is displayed with highlight and the level meter L2 for the right flick gesture slightly increases.

Figure 4C:
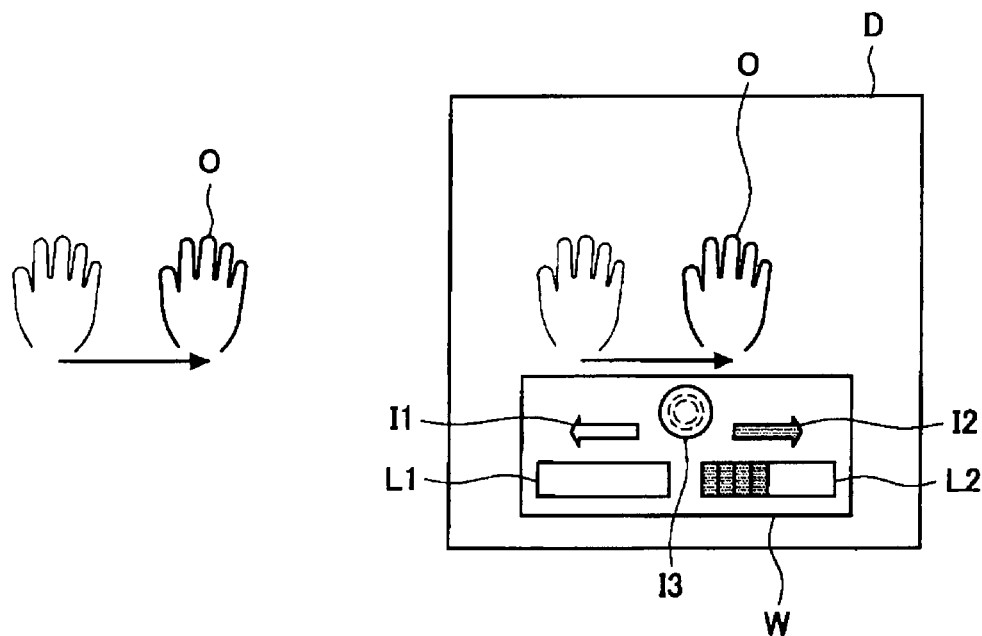
FIG. 4C is a diagram (3/5) showing an example of a notification of a prediction result and the reliability of the prediction result.

When the user U further moves the hand O from the state shown in FIG. 4B to the right as shown in FIG. 4C, a check result indicating a higher similarity is obtained and it is judged that the reliability of the prediction result further increases. In the window W, the level meter L2 for the right flick gesture further increases.

Figure 4D:
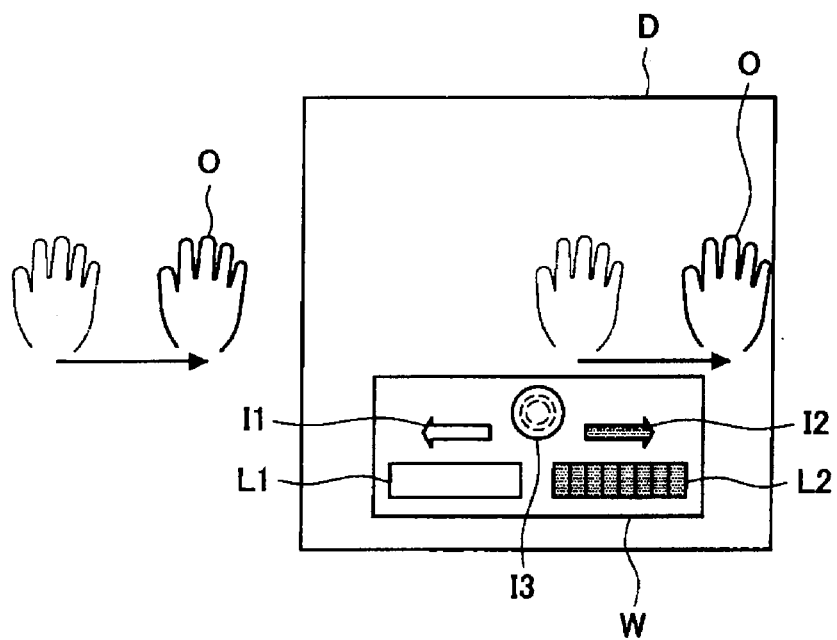
FIG. 4D is a diagram (4/5) showing an example of a notification of a prediction result and the reliability of the prediction result.

Here, when the user U further moves the hand O to the right from the state shown in FIG. 4C as shown in FIG. 4D, and it is judged that the check result for the right flick gesture indicates a similarity of the first threshold or more before the input period has elapsed, the right flick gesture is recognized. In the window W, the level meter L2 for the right flick gesture reaches a highest level.

Figure 4E:
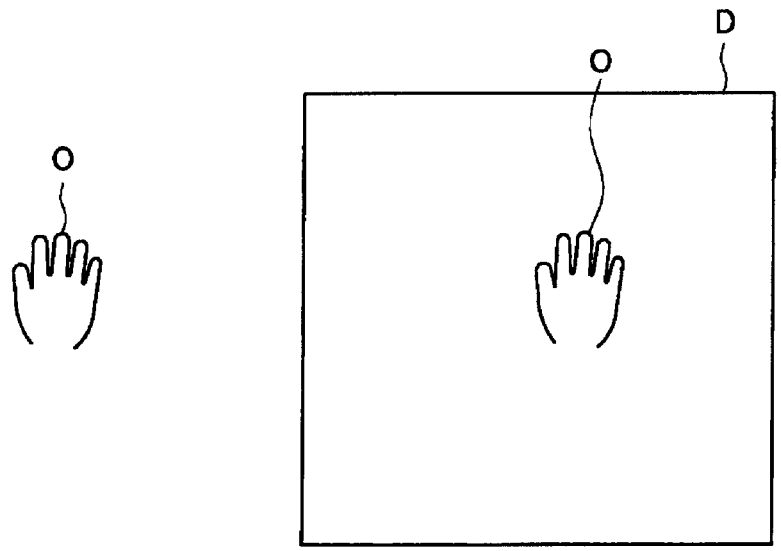
FIG. 4E is a diagram (5/5) showing an example of a notification of a prediction result and the reliability of the prediction result.

On the other hand, when the user U does not move the hand O to the right from the state shown in FIG. 4C as shown in FIG. 4E and it is not judged that the check result for the right flick gesture indicates the similarity of the first threshold or more before the input period has elapsed, the right flick gesture is not recognized and the recognition process stops. On the display D, the window W is not displayed and only the image obtained by capturing the hand O is displayed.

Figure 5A:
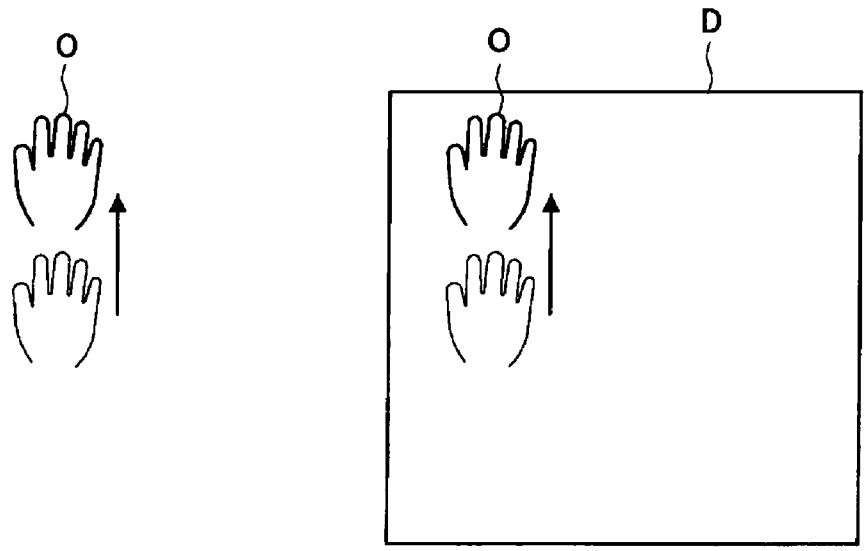
FIG. 5A is a diagram (1/3) showing another example of a notification of a prediction result and the reliability of the prediction result.
Figure 5B:
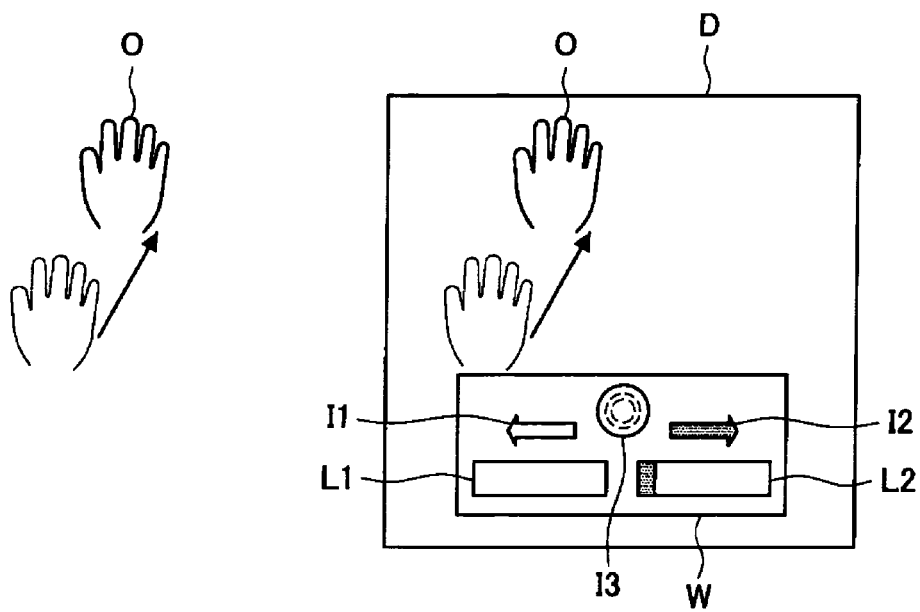
FIG. 5B is a diagram (2/3) showing another example of a notification of a prediction result and the reliability of the prediction result.
Figure 5C:
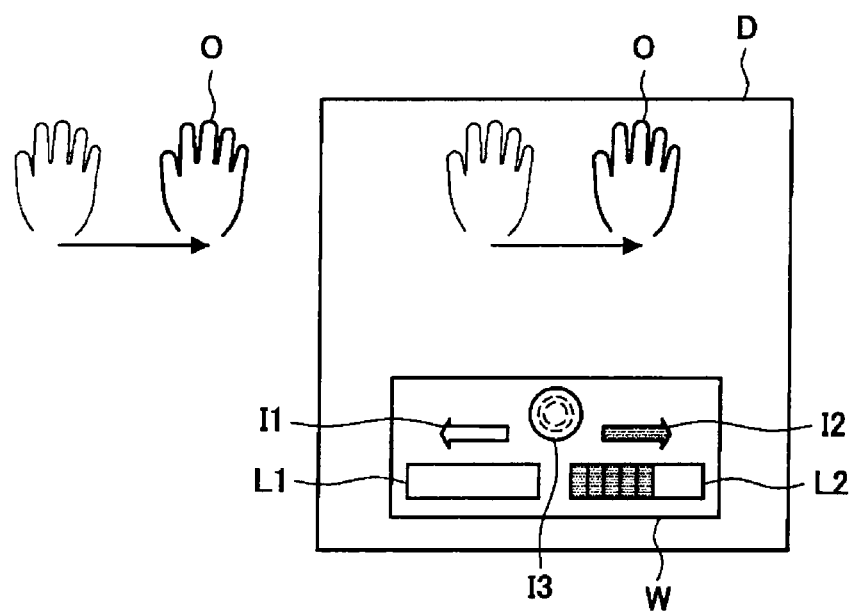
FIG. 5C is a diagram (3/3) showing another example of a notification of a prediction result and the reliability of the prediction result.

In FIGS. 5A to 5C, other examples of a notification of a prediction result and the reliability of the prediction result are shown. In the example shown in FIG. 5A, when left and right flick gestures are recognition objects, the user U moves the hand O upward. In this case, since gesture information indicating a movement to the left and right is not generated, it is not judged that the reliability of the result of predicting any gesture is equal to or more than the second threshold. Accordingly, the notification of the gesture prediction information is not initiated. Thereby, since the prediction information is not notified of despite the movement of the hand O, the user U can notice an erroneous input of the gesture information.

Meanwhile, in the example shown in FIG. 5B, the user U moves the hand O in the right and up directions. In this case, since gesture information indicating a slight movement to the right is generated as a component of a motion vector of the recognition object, it is judged that the reliability of the result of predicting the right flick gesture is equal to or more than the second threshold at a time when the user U moves the hand O in the right and up directions to some extent. Accordingly, the display is late compared to the case in which the user moves the hand O to the right, but a notification of the gesture prediction information is initiated.

In the window W, the icon I2 indicating the right flick gesture is displayed with highlight, and the level meter L2 for the right flick gesture slightly increases. Thereby, since the display of the window W is late and the reliability of the prediction result does not increase as expected despite the movement of the hand O, the user U can notice an erroneous input of the gesture information.

In the example shown in FIG. 5C, the user U moves the hand O to the right from the state shown in FIG. 5B. In this case, since gesture information indicating the movement to the right is input, a check result indicating a higher similarity is obtained and it is judged that the reliability of the prediction result further increases. In the window W, the level meter L2 for the right flick gesture further increases. Thereby, the user U can notice an erroneous input of the gesture information and correct the input, and can confirm that the input of the gesture information is appropriate since the reliability of the prediction result increases as expected.

Figure 6A:
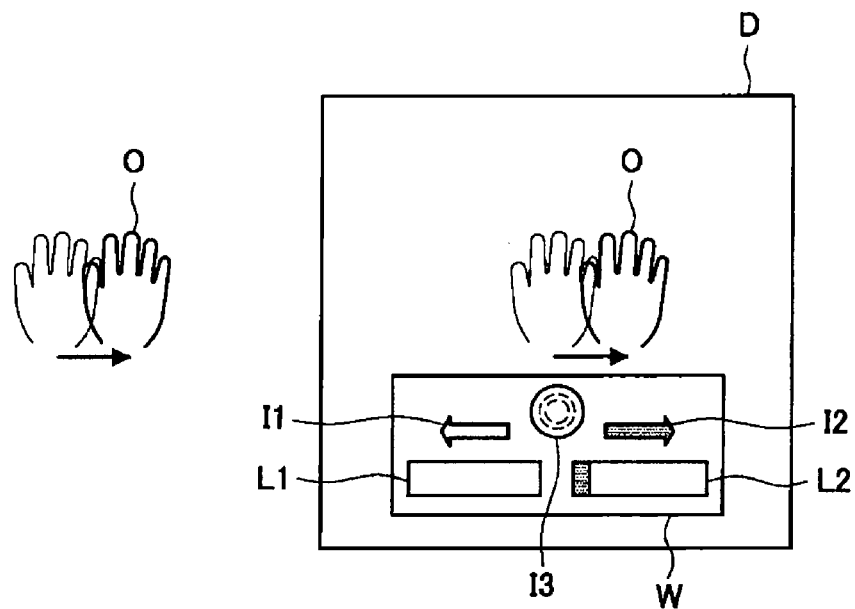
FIG. 6A is a diagram (1/2) showing another example of a notification of a prediction result and the reliability of the prediction result.
Figure 6B:
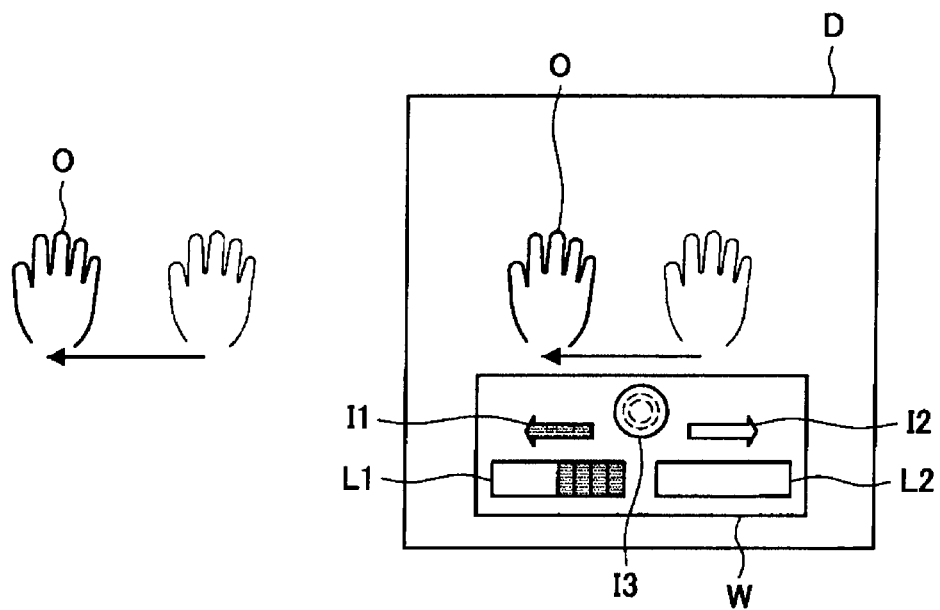
FIG. 6B is a diagram (2/2) showing another example of a notification of a prediction result and the reliability of the prediction result.

In FIGS. 6A and 6B, other examples of a notification of a prediction result and the reliability of the prediction result are shown. In the example shown in FIG. 6A, the user U erroneously moves the hand O slightly to the right despite the user U desiring to input a left flick gesture. In this case, since gesture information indicating the slight movement to the right is generated, it is judged that the reliability of the result of predicting the right flick gesture is equal to or more than the second threshold. Accordingly, a notification of the gesture prediction information is initiated.

In the window W, the icon I2 indicating the right flick gesture is displayed with highlight, and the level meter L2 for the right flick gesture slightly increases. Thereby, the user U can notice the erroneous input of the gesture information by confirming that the icon I2 indicating the right flick gesture is displayed with highlight despite the user U desiring to input the left flick gesture.

In the example shown in FIG. 6B, the user U moves the hand O to the left from the state shown in FIG. 6A. In this case, since gesture information indicating the movement to the left is generated, the result of predicting the left flick gesture indicates a similarity of the second threshold or more. Accordingly, in the window W, the icon I1 indicating the left flick gesture instead of the right flick gesture is displayed with highlight and the level meter L1 for the left flick gesture increases. Thus, the user U can notice an erroneous input of the gesture information and then correct the input.

Figure 7:
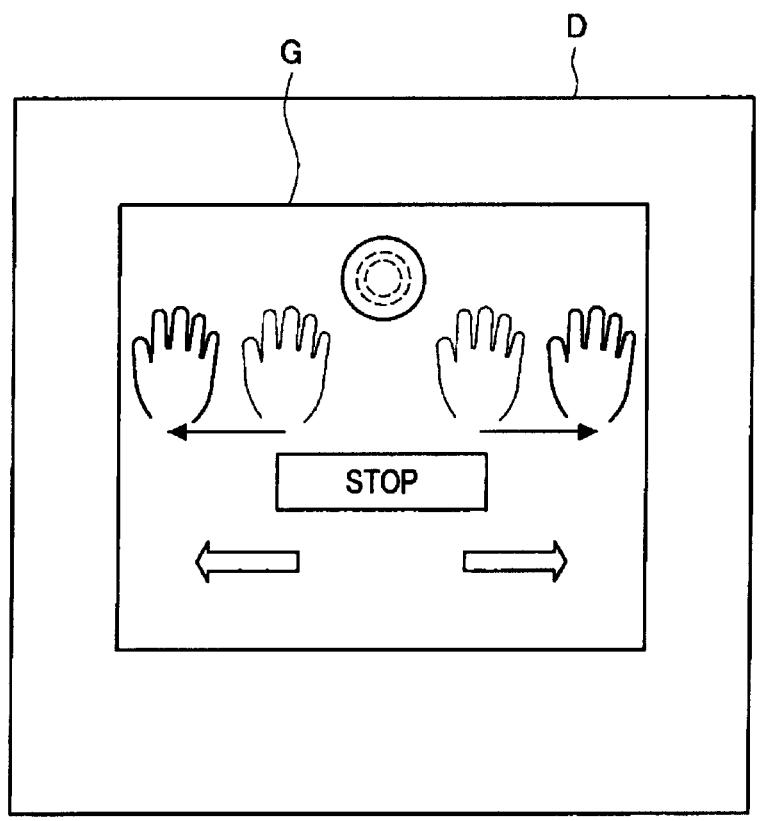
FIG. 7 is a diagram showing an example of a notification of a gesture list.

In FIG. 7, an example of a notification of a list of gestures is shown. In the gesture recognition apparatus 1, when a gesture is not recognized in the input period, a recognition fail log is recorded. When the recognition fail log is recorded at a frequency of a given threshold or more in a given period, the user U is notified of a list G of gestures to be recognized.

As shown in FIG. 7, in the gesture list G, a type of a gesture to be recognized and a method of inputting the gesture are shown. In the gesture list, for example, an indication that fast-forward and rewind for music play can be performed by moving the hand O right and left, and stop can be performed by shielding the front of the moving image sensor 11 is shown. This allows a user U unfamiliar with a manipulation of a system to learn a gesture to be recognized by referencing the gesture list G.

[4. Variant of Notification of Prediction Information]

Figure 8A:
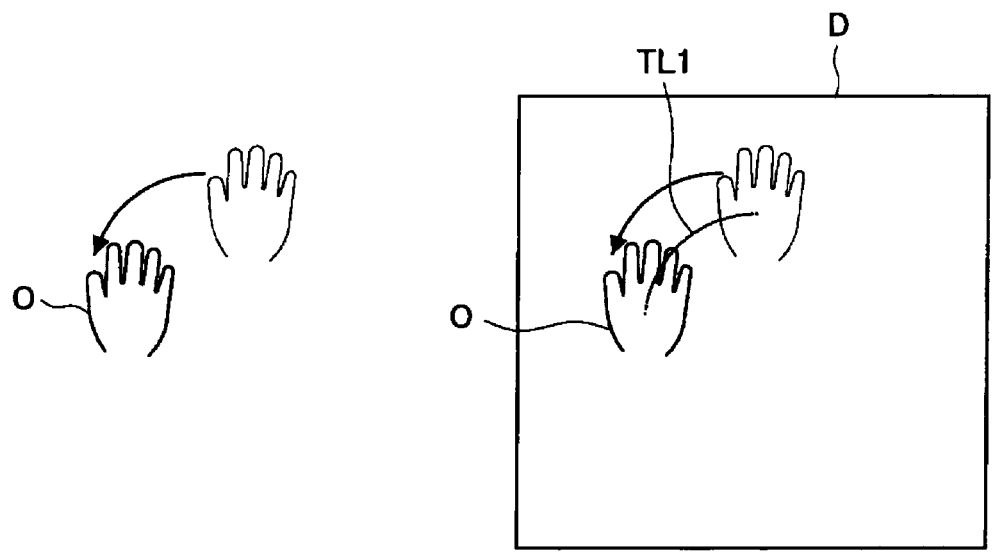
FIG. 8A is a diagram (1/3) showing an example of a notification of the reliability of a prediction result.
Figure 8B:
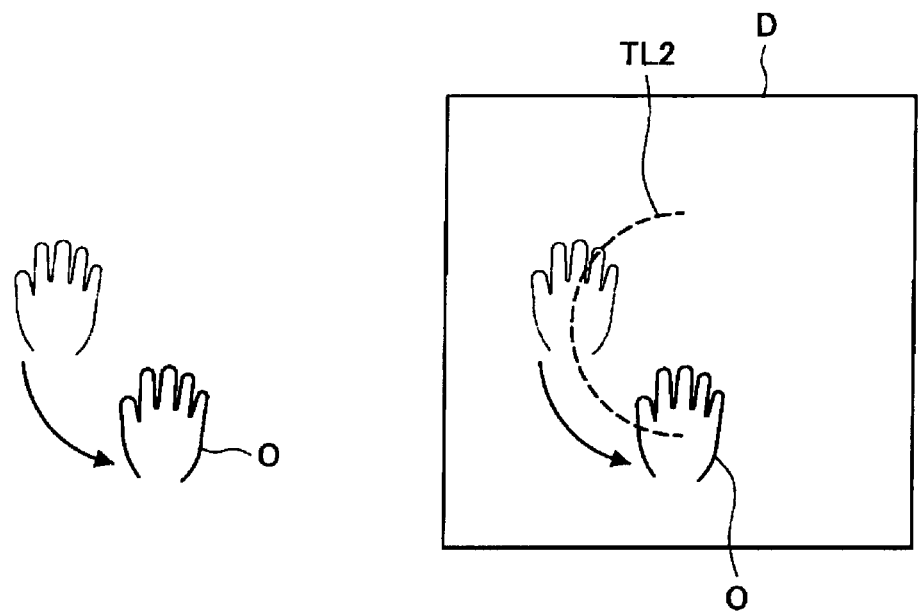
FIG. 8B is a diagram (2/3) showing an example of a notification of the reliability of the prediction result.
Figure 8C:
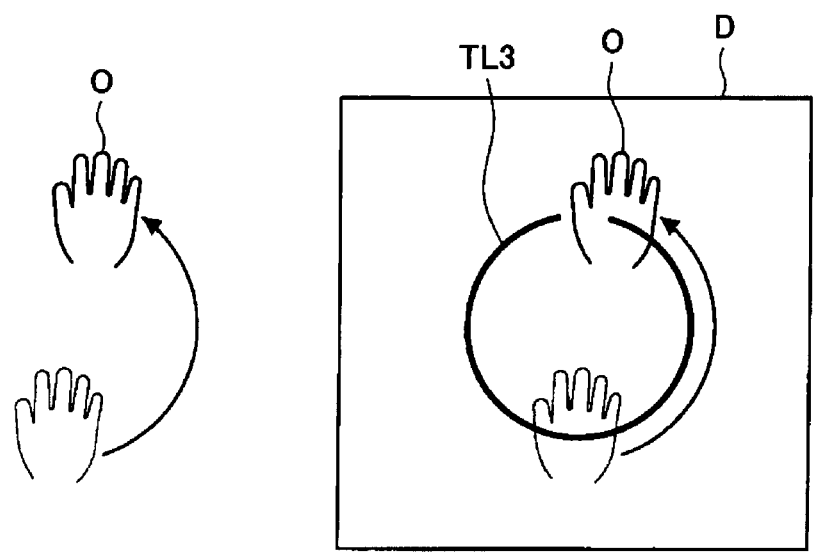
FIG. 8C is a diagram (3/3) showing an example of a notification of the reliability of the prediction result.

In FIGS. 8A to 8C, examples of a notification of the reliability of the prediction result are shown. In the example shown in FIG. 8A, when a circle gesture of drawing a circle with an object O is a recognition object, the reliability of the result of predicting the gesture is notified of using a trajectory line TL (a general trajectory line) indicating a movement of the object O. As shown in FIG. 8A, when the user U draws a quadrant with the hand O, a real-time image obtained by capturing the hand O and a quadrant trajectory line TL1 indicating a movement process of the hand O are displayed on the display D. The trajectory line TL1 is displayed as a relatively thin line or a light or dark colored line.

As shown in FIG. 8B, when the user U draws a semicircle with the hand O from the state shown in FIG. 8A, a semicircular trajectory line TL2 indicating a movement process of the hand O is displayed on the display D. Here, the trajectory line TL2 is displayed as a bold line or a dark or bright colored line compared to the trajectory line TL1 shown in FIG. 8A. That is, since the reliability of the prediction result specifying the circle gesture in the state shown in FIG. 8B increases compared to the state shown in FIG. 8A, the user U is notified of increase of the reliability through a type, color, or chroma of the trajectory line TL.

Further, as shown in FIG. 8C, when the user U almost draws a circle with the hand O from the state shown in FIG. 8B, a substantially circular trajectory line TL3 indicating a movement process of the hand O is displayed on the display D. Here, the trajectory line TL3 is displayed as a bold line or a dark or bright colored line compared to the trajectory line TL2 shown in FIG. 8B. When it is judged that the result of checking the circle gesture indicates similarity of the first threshold or more, the circle gesture is recognized.

Figure 9A:
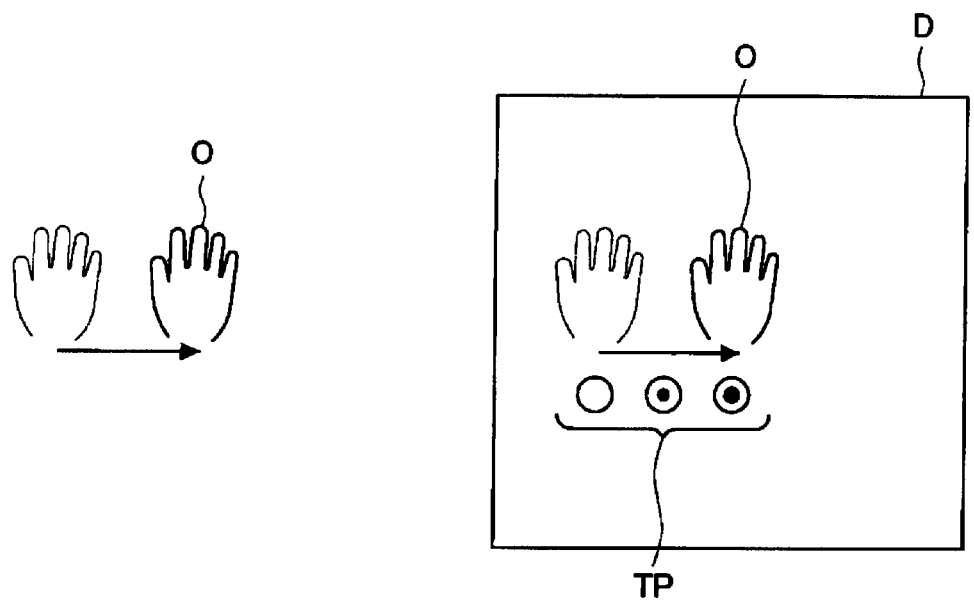
FIG. 9A is a diagram (1/2) showing another example of a notification of the reliability of a prediction result.
Figure 9B:
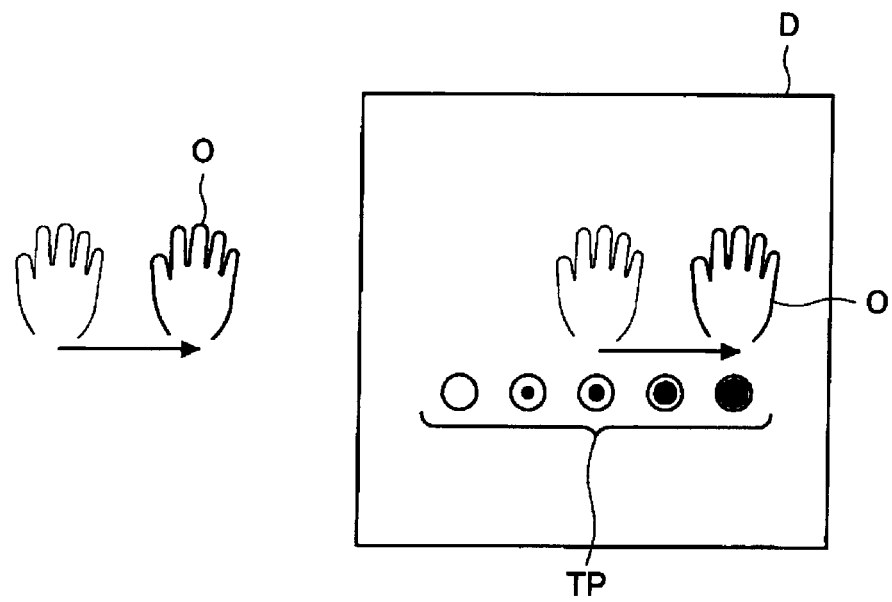
FIG. 9B is a diagram (2/2) showing another example of a notification of the reliability of the prediction result.

In FIGS. 9A and 9B, another example of a notification of the reliability of the prediction result is shown. In the example shown in FIG. 9A, when a right flick gesture is a recognition object, the reliability of the gesture prediction result is notified of using a trajectory point TP indicating a movement of the object O. As shown in FIG. 9A, when the user U moves the hand O to the right a certain distance, a real-time image obtained by capturing the hand O and a plurality of trajectory points TP indicating the movement process of the hand O are displayed on the display D. The trajectory points TP are displayed by combining a white dot symbol and a black dot symbol located at a center of the white dot symbol.

As shown in FIG. 9B, when the user U further moves the hand O to the right from the state shown in FIG. 9A, a plurality of trajectory points TP indicating a movement process of the hand O are further displayed on the display D. Here, as the movement distance of the hand O increases, the black dot symbol located at the center of the white dot symbol is displayed with a larger size. That is, as the movement distance of the hand O increases, the reliability of the prediction result specifying the right flick gesture increases, and thus the user U is notified of the increase of the reliability through the changed size of the black dot symbol. When it is judged that the check result for the right flick gesture indicates a similarity of the first threshold or more, the right flick gesture is recognized.

[5. Modified Example of Gesture Recognition Apparatus]

Next, a gesture recognition apparatus 2 according to a modified example will be described. In the gesture recognition apparatus 2 according to the modified example, an action gesture and/or a speech gesture are recognized using a voice sensor 29 and/or a moving image sensor 11.

Figure 10:
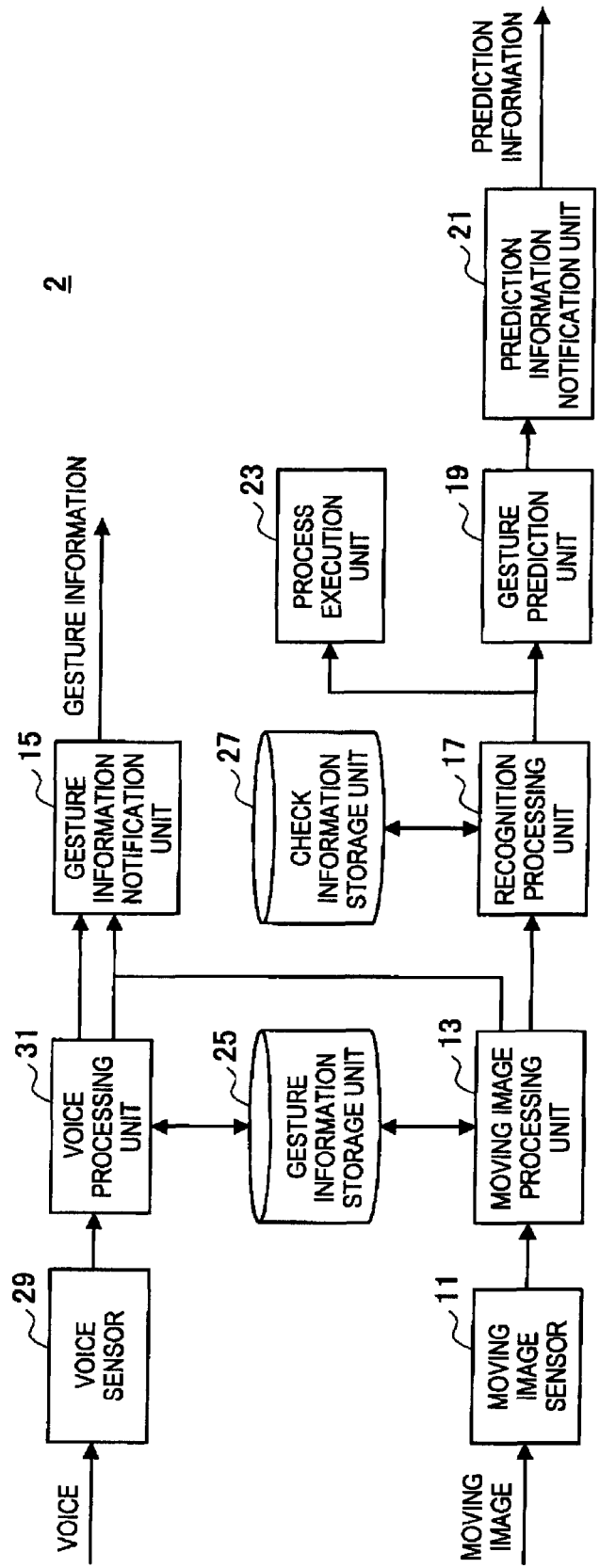
FIG. 10 is a block diagram showing a primary functional configuration of the gesture recognition apparatus according to a modified example.

As shown in FIG. 10, the gesture recognition apparatus 2 includes the moving image sensor 11, a moving image processing unit 13, a gesture information notification unit 15, a recognition processing unit 17, a gesture prediction unit 19, a prediction information notification unit 21, a process execution unit 23, a gesture information storage unit 25, a check information storage unit 27, the voice sensor 29 and a voice processing unit 31. Hereinafter, overlapping explanation with the above-described gesture recognition apparatus 1 will be omitted.

The voice sensor 29 receives an utterance of a user U around the sensor and generates a voice signal indicating the result of receiving the utterance. The voice processing unit 31 processes the voice signal supplied from the voice sensor 29 and generates speech gesture information. The speech gesture information is information indicating the speech of the user U, such as a word, phrase, clause, and sentences. The speech gesture information is temporarily stored in the gesture information storage unit 25.

The recognition processing unit 17 reads gesture information for an action gesture and/or a speech gesture from the gesture information storage unit 25 and check information from the check information storage unit 27, and processes the gesture information based on the check information. Here, the check information for the speech gesture is set as a given voice pattern (e.g., height, length and volume of a phoneme). The result of check corresponds to a similarity between a voice pattern represented by a set of gesture information and a voice pattern represented by the check information for each gesture. Here, for a complex gesture that is a combination of the action gesture and the speech gesture, a check result is obtained as the complex gesture by combining a result of checking the action gesture and a result of checking the speech gesture.

The gesture information notification unit 15 notifies the user U of the gesture information for the action gesture and/or the speech gesture supplied from the moving image processing unit 13 and the voice processing unit 31. The gesture information of the speech gesture may be character information indicating the recognized voice pattern or voice information reciting the recognized voice pattern. In the gesture information notification unit 15, the user U is notified of the gesture information through a display D or a speaker, which is not shown.

The gesture prediction unit 19 predicts a gesture about to be input based on the check result supplied from the recognition processing unit 17. In the gesture prediction unit 19, a gesture having the highest similarity is specified as a gesture prediction result. Here, for the complex gesture, the gesture prediction result is specified by combining similarities of the result of checking an action gesture and the result of checking the speech gesture.

For example, when a speech gesture "Saisei Okuri" or "Saisei Modosi" is recognized, the process execution unit 23 may execute a forward or rewind process. When a speech gesture "Okuri" or "Modosi" is recognized together with a flick gesture, the process execution unit 23 may execute the forward or rewind process.

[6. Summary]

As described above, according to the gesture recognition apparatus 1 or 2 and the gesture recognition method according to the embodiment of the present invention, in the gesture recognition process, the gesture is predicted from halfway input gesture information among a set of gesture information, and the user U is notified of the prediction information about the gesture prediction result. Accordingly, the user U can confirm what kind of gesture is recognized by continuing to input the gesture information through the notification of the prediction information.

Thus, when expected prediction information is not obtained, the user U can notice an erroneous input of gesture information and correct the input. Further, the user U can intuitively understand how to input the gesture by inputting the gesture information in trial and error and confirming the prediction information. Thus, according to the gesture recognition apparatus 1 or 2 and the gesture recognition method according to the embodiment of the present invention, it is possible to perform an appropriate gesture feedback using the gesture prediction information.

It should be understood by those skilled in the art that various modifications, combinations, sub-combinations and alterations may occur depending on design requirements and other factors insofar as they are within the scope of the appended claims or the equivalents thereof.

For example, the case in which the gesture prediction information and the gesture information are notified of as image information has been mainly described. However, the gesture prediction information and the gesture information may be notified of as information such as voice information instead of the image information (or together with the image information).

The present application contains subject matter related to that disclosed in Japanese Priority Patent Application JP 2010-143651 filed in the Japan Patent Office on Jun. 24, 2010, the entire content of which is hereby incorporated by reference.

What is claimed is:

1. A gesture recognition apparatus comprising:
a processor;
a recognition unit configured to recognize a gesture based on a set of gesture information input in a given input period;
a prediction unit configured to predict a type of the gesture from a partially input gesture information among the set of gesture information; and
a notification unit configured to notify a user of prediction information about the result of predicting the gesture,
wherein the prediction information includes a prediction confidence value of the gesture prediction result.

2. The gesture recognition apparatus according to claim 1, wherein the prediction confidence value is represented as a ratio of the partially input gesture information to the set of gesture information.

3. The gesture recognition apparatus according to claim 2, wherein the prediction confidence value sharply increases when the ratio increases.

4. The gesture recognition apparatus according to claim 1, wherein the notification unit initiates a notification of the prediction information when the prediction confidence value is equal to or greater than a given threshold.

5. The gesture recognition apparatus according to claim 4, wherein the notification unit terminates the notification of the prediction information when the set of gesture information is not input in the input period.

6. The gesture recognition apparatus according to claim 1, wherein the notification unit notifies of a list of recognizable gestures when a frequency at which the set of gesture information is not input in the input period is equal to or more than a given threshold.

7. The gesture recognition apparatus according to claim 1, further comprising a second notification unit configured to notify the user of the gesture information.

8. The gesture recognition apparatus according to claim 1, further comprising an input unit configured to input image information as the gesture information.

9. The gesture recognition apparatus according to claim 1, further comprising an input unit configured to input voice information as the gesture information.

10. The gesture recognition apparatus according to claim 1, wherein the type of the gesture is a left swipe or a right swipe.

11. The gesture recognition apparatus according to claim 1, wherein the type of the gesture is a motion performed by a hand.

12. The gesture recognition apparatus according to claim 1, wherein the prediction confidence value indicates a level of confidence of an accuracy of the gesture prediction result.

13. The gesture recognition apparatus according to claim 1, wherein the notification unit notifies the user of the prediction information by providing an indicator depicting a representation of a level of the prediction confidence value.

14. The gesture recognition apparatus according to claim 13, wherein the level of the prediction confidence value increases as the gesture information is fully input.

15. The gesture recognition apparatus according to claim 1, wherein the notification unit notifies the user of the prediction information by providing an first indicator depicting a representation of the type of the recognized gesture and a second indicator depicting a representation of a level of the prediction confidence value.

16. A gesture recognition method comprising the step of recognizing a gesture based on a set of gesture information input in a given input period,
wherein the recognition step includes predicting a type of the gesture from partially input gesture information among the set of gesture information, and notifying a user of prediction information about the result of predicting the gesture, and
wherein the prediction information includes a prediction confidence value of the gesture prediction result.

17. A non-statutory computer-readable medium having embodied thereon a program, which when executed by a computer causes the computer to execute a step of recognizing a gesture based on a set of gesture information input in a given input period,
wherein the recognition step includes predicting a type of the gesture from partially input gesture information among the set of gesture information, and notifying a user of prediction information about the result of predicting the gesture, and
wherein the prediction information includes a prediction confidence value of the gesture prediction result.

* * * * *